US010142183B2

(12) United States Patent
Cohn et al.

(10) Patent No.: US 10,142,183 B2
(45) Date of Patent: Nov. 27, 2018

(54) SNAPSHOTTING AND INSTANTIATING A VIRTUAL TOPOLOGY

(71) Applicant: Oracle International Corporation, Redwood Shores, CA (US)

(72) Inventors: Daniel Cohn, Oakland, CA (US); Jagwinder Singh Brar, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 54 days.

(21) Appl. No.: 15/252,036

(22) Filed: Aug. 30, 2016

(65) Prior Publication Data

US 2018/0062932 A1   Mar. 1, 2018

(51) Int. Cl.
H04L 12/66       (2006.01)
H04L 12/24       (2006.01)
H04L 12/751      (2013.01)
H04L 12/46       (2006.01)

(52) U.S. Cl.
CPC .............. *H04L 41/12* (2013.01); *H04L 45/02* (2013.01); *H04L 12/4641* (2013.01)

(58) Field of Classification Search
CPC combination set(s) only.
See application file for complete search history.

(56) References Cited

U.S. PATENT DOCUMENTS

| 7,813,263 | B2 | 10/2010 | Chang et al. |
| 8,224,971 | B1 | 7/2012 | Miller et al. |
| 8,640,220 | B1 | 1/2014 | Vincent et al. |
| 9,274,811 | B1 * | 3/2016 | Reeves ............... G06F 8/61 |
| 9,806,948 | B2 | 10/2017 | Masurekar et al. |
| 9,825,822 | B1 | 11/2017 | Holland |
| 2003/0189930 | A1 | 10/2003 | Terrell et al. |
| 2009/0248896 | A1 | 10/2009 | Cohn |

(Continued)

OTHER PUBLICATIONS

Cavdar, Optical Networks Virtual Topology Design, Optical Networks Lab (ONLab) Royal Institute of Technology, 69 pages, Sep. 2012.*

(Continued)

*Primary Examiner* — Frank Duong
(74) *Attorney, Agent, or Firm* — Invoke

(57) ABSTRACT

Snapshotting and instantiating a virtual topology are described. A virtual topology includes a set of virtual topology entities (VTEs), each associated with VTE characteristics. A snapshot engine traverses each VTE in a virtual topology instantiated on a physical topology. The snapshot engine stores the VTE characteristics of each traversed VTE in a virtual topology template. The virtual topology template may be used to deploy the same virtual topology onto another physical topology. Additionally or alternatively, a deployment engine receives a virtual topology template and/or user commands for instantiating a virtual topology. The deployment engine generates deployment commands based on the virtual topology template and/or user commands. The deployment engine identifies VTE characteristics of each VTE based on the deployment commands. The deployment engine instantiates each VTE onto a physical topology. A single virtual topology template may be used to deploy the same virtual topology onto one or more physical topologies.

20 Claims, 11 Drawing Sheets

(56) References Cited

U.S. PATENT DOCUMENTS

| | | |
|---|---|---|
| 2015/0195137 A1 | 7/2015 | Kashyap et al. |
| 2015/0244617 A1 | 8/2015 | Nakil et al. |
| 2017/0302565 A1* | 10/2017 | Ghobadi ................. H04L 45/14 |
| 2018/0159801 A1 | 6/2018 | Rajan et al. |
| 2018/0205673 A1 | 7/2018 | Jain et al. |

OTHER PUBLICATIONS

"Comparison of Firewalls," Wikipedia, available at https://en.wikipedia.org/wiki/Comparison_of_firewalls (accessed on May 6, 2016).

* cited by examiner

SNAPSHOTTING AND INSTANTIATING A VIRTUAL TOPOLOGY

RELATED APPLICATION; INCORPORATION BY REFERENCE

This application is related to U.S. Non-Provisional patent application Ser. No. 15/227,516, filed Aug. 3, 2016, which is hereby incorporated by reference.

TECHNICAL FIELD

The present disclosure relates to computer networks. In particular, the present disclosure relates to specifying and snapshotting a virtual topology corresponding to a computer network.

BACKGROUND

A computer network provides connectivity among a set of nodes. The set of nodes are connected by a set of links. The nodes may be local to and/or remote from each other. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

A computer network may be shared amongst multiple entities that are independent from each other (also referred to as "tenants" or "customers"). The computer network and the network resources thereof are accessed by clients corresponding to different tenants. Such a computer network may be referred to as a "multi-tenant computer network." Different tenants may demand different network requirements for the computer network. The same computer network may need to implement different network requirements demanded by the different tenants.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
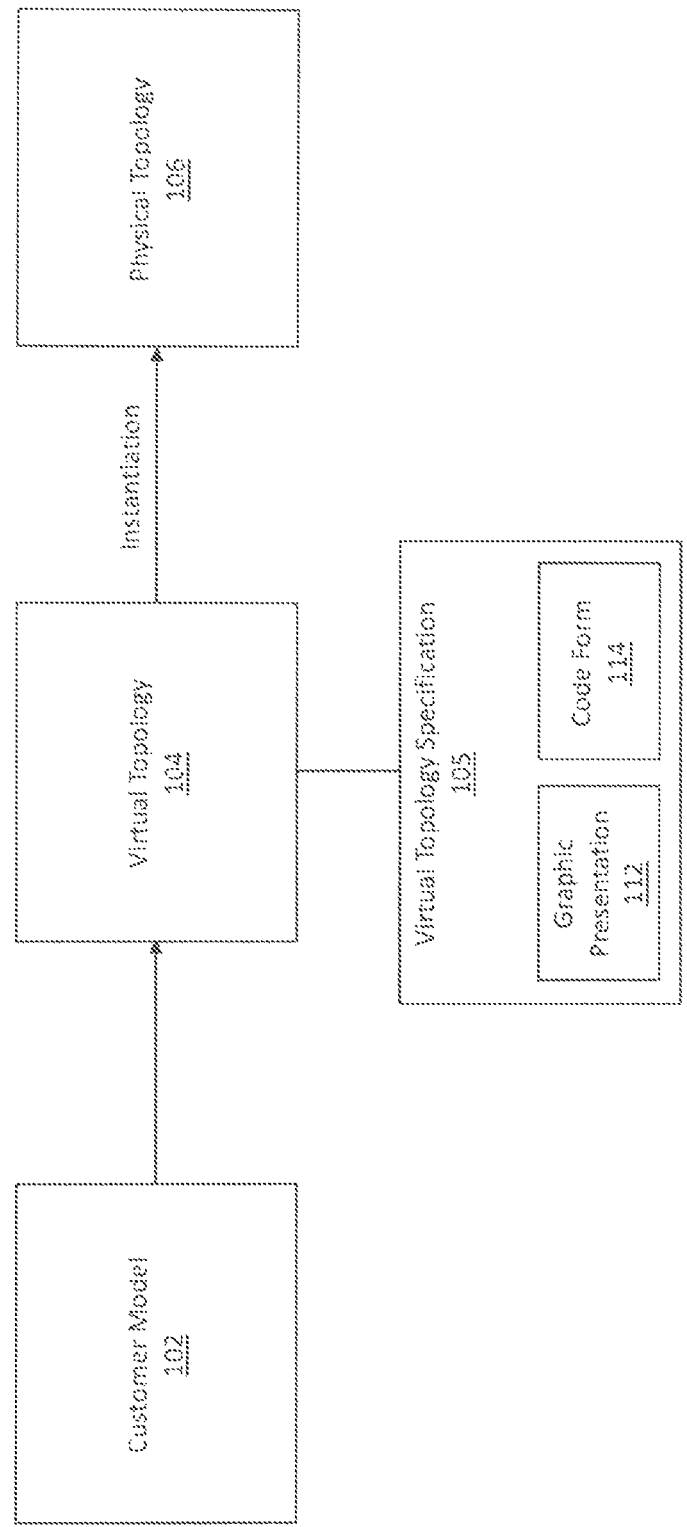
FIG. 1 illustrates relationships between a customer model, a virtual topology specification, and a physical topology, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PHYSICAL TOPOLOGIES AND VIRTUAL TOPOLOGIES
3. VIRTUAL TOPOLOGY DEPLOYMENT SYSTEM ARCHITECTURE
4. SNAPSHOTTING A VIRTUAL TOPOLOGY
5. INSTANTIATING A VIRTUAL TOPOLOGY
6. EXAMPLE EMBODIMENTS
7. COMPUTER NETWORKS
8. MISCELLANEOUS; EXTENSIONS
9. HARDWARE OVERVIEW

1. General Overview

In one or more embodiments, a computer network is implemented in accordance with a virtual topology that is instantiated on a physical topology.

A physical topology is a particular arrangement of digital devices, such as function-specific hardware devices and/or generic machines.

A virtual topology is a particular arrangement of virtual topology entities (VTEs). Each VTE is associated with one or more VTE characteristics. VTE characteristics include a functionality, configuration, and/or relationship corresponding to a VTE.

A virtual topology is instantiated on a physical topology based on a virtual topology specification. During instantiation, VTEs of a virtual topology specification are mapped to digital devices of a physical topology. A single VTE may be mapped to multiple digital devices. Conversely, multiple VTEs may be mapped to a single digital device. A particular digital device mapped to a particular VTE implements the functions corresponding to the particular VTE. The virtual topology specification may but does not necessarily include any reference to a physical topology or digital devices therein. The virtual topology specification may but does not necessarily specify which digital devices of the physical topology perform which functions of which VTEs.

One or more embodiments include snapshotting an instantiated virtual topology. A virtual topology snapshot engine (also referred to as a "snapshot engine") identifies a virtual topology instantiated on a physical topology. The instantiated virtual topology may have been specifically designed to satisfy a tenant's network requirements. The snapshot engine determines an initial VTE to begin a snapshotting process based on user input and/or another application. Starting with the initial VTE, the snapshot engine recursively determines the VTEs related to each VTE. The snapshot engine stores the VTE characteristics corresponding to each traversed VTE in a virtual topology template. The virtual topology template may be used to deploy the same virtual topology onto multiple physical topologies. Hence, the same virtual topology that is known to satisfy certain network requirements may be deployed in multiple locations. There is no need to redo the work of designing a computer network that satisfies the network requirements at multiple locations.

One or more embodiments include instantiating a virtual topology, onto a physical topology, based on a virtual topology specification. A virtual topology deployment engine (also referred to as a "deployment engine") obtains a virtual topology specification. The virtual topology specification may be a virtual topology template generated by a snapshot engine, as described above. Additionally or alternatively, the virtual topology specification may be a set of user commands specified via a user interface. The deployment engine identifies a physical topology on which to instantiate the virtual topology. The deployment engine generates a set of deployment commands for instantiating the virtual topology onto the physical topology. Based on the deployment commands, the deployment engine identifies a functionality, configuration, and/or relationship corresponding to each VTE of the virtual topology. The deployment engine instantiates each VTE in accordance with the deployment commands. The deployment engine establishes relationships between the VTEs in accordance with the deployment commands. Optionally, the deployment engine may iterate the deployment process to instantiate the virtual topology onto any number of physical topologies.

One or more embodiments described in this Specification and/or recited in the claims may not be included in this General Overview section.

2. Physical Topologies and Virtual Topologies

FIG. 1 illustrates relationships between a customer model 102, a virtual topology 104, and a physical topology 106, in accordance with one or more embodiments.

In one or more embodiments, a physical topology 106 includes a particular arrangement of digital devices of a computer network. Digital devices include function-specific hardware devices and/or generic machines. An example of a physical topology 106 is discussed below with reference to FIG. 2B.

The term "digital device" generally refers to any hardware device that includes a processor. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, a function-specific hardware device, a mainframe, a television, a content receiver, a set-top box, a printer, a mobile handset, a smartphone, and a personal digital assistant ("PDA").

In an embodiment, the digital devices of a physical topology 106 form a computer network that provides connectivity between clients and network resources. Network resources include hardware and/or software configured to execute server processes. Examples of network resources include a processor, a data storage, a virtual machine, a container, and/or a software application. Network resources are shared amongst multiple clients. Such a computer network may be referred to as a "cloud network."

Additionally, the digital devices of a physical topology 106 form a computer network that is shared amongst multiple tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. As an example, Best Bank may require that all emails pass through a particular firewall before entering a computer network that processes the data of Best Bank. State Security Agency may require that address translation be applied to all data entering a computer network that processes the data of State Security Agency. The same computer network may need to implement different network requirements demanded by different tenants.

Additional embodiments and/or examples relating to computer networks are described below in Section 7, titled "Computer Networks."

In one or more embodiments, a customer model 102 includes a particular arrangement of components of a computer network that is requested by a customer. The computer network may be an on-premise network of the customer and/or a private network of the customer. A customer model 102 may correspond to a computer network that is implemented by the customer and/or a customer's design of a computer network. A customer may request a particular customer model 102 in order to satisfy network requirements as well as security, performance, behavioral, and/or resiliency goals. As an example, a customer model may include (a) a primary server and (b) a backup server that duplicates the primary server. The backup server may replace the primary server in the event a failure occurs with the primary server. The customer model includes the duplicated servers to increase a level of resiliency of the computer network.

In an embodiment, a customer model 102 may include an arrangement of digital devices that is unnecessarily duplicative and/or inefficient. The efficiencies may be a result of the constraints imposed by the physical nature of customer model 102. As an example, a physical design may include specification of each redundant paired component and corresponding interconnections. The physical design may specify that the redundant paired components are horizontally scaled according to a particular heuristic. The physical design may include specification of each scaled element and corresponding interconnections. The specification of redundant elements may give rise to inefficiencies.

In an embodiment, a customer may request implementation of a customer model 102 on a multi-tenant computer network. Implementation of the customer model 102 may include migrating a computer network already implemented by the customer onto the multi-tenant computer network.

However, the customer model 102 may have no relationship to the physical topology 106 of the multi-tenant computer network. The customer model 102 and the physical topology 106 of the multi-tenant computer network may include different components and/or a different arrangement of the components. As explained in further detail below, the customer model 102 may be used to determine a virtual topology specification 105, which is used to instantiate with a virtual topology 104 on a physical topology 106.

In one or more embodiments, a virtual topology 104 includes a particular arrangement of virtual topology entities (VTEs). Each VTE is associated with one or more VTE characteristics. VTE characteristics include a functionality of a VTE, a configuration of the VTE, and/or a relationship of the VTE.

A functionality of a VTE may be implemented in order to satisfy network requirements and/or improve security, resiliency, and/or performance levels. Examples of VTE functionality include but are not limited to the ability to:

(a) Routing and/or forwarding data to a next hop;
(b) Filtering and/or rejecting data based on a criterion;
(c) Inspecting data for security issues and/or other issues;
(d) Hiding and/or modifying a source address and/or destination address of data;
(e) Distributing data to resources based on availability of resources;
(f) Compressing data;
(g) Caching data;
(h) Storing data; and
(i) Processing data.

A VTE associated with a particular functionality may operate as a particular type of virtual component and/or physical component. Examples of VTEs include but are not limited to a gateway, a router, a switch, a hub, a proxy, a firewall, an intrusion detection system (IDS), a network address translator (NAT), a load balancer, and a network optimizer.

As an example, a VTE may filter data based on a set of security rules specified by a user (such as, a network administrator). The VTE may reject data based on the contents of the Internet Protocol (IP) and Transport headers of the data. The VTE may operate as an IP firewall. Other VTEs may filter data based on other characteristics of the data, such as the contents corresponding to the application layer of the data. These other VTEs may operate as firewalls of different types.

As another example, a VTE may monitor data for offline analysis of security anomalies. Offline analysis means that the analysis is performed after a decision to allow or reject data has already been made (this decision may be made by a firewall). Offline analysis allows the IDS to perform more complex inspection of the data than the firewall. The VTE may operate as an IDS.

As another example, a VTE may replace the source address and/or destination address of the data. The VTE may operate as a NAT. In some cases, multiple client devices within a particular Local Area Network (LAN) may share a single external or public IP address. The client devices may be assigned private IP addresses. A particular client device may transmit data to an external network outside of the LAN via a NAT. The source address of the data may be the private IP address of the particular client device. The NAT may replace the source address with the public IP address (used for outbound communication from all client devices in the LAN) prior to transmitting the data to the external network.

As another example, a VTE may serve as a single point of entry to multiple services. The VTE may forward service requests to a particular component based on the load of the components in the computer network. The VTE may operate as a load balancer.

As another example, a VTE may perform various functions to improve latency, bandwidth consumption, and/or other performance parameters of a computer network. The VTE may eliminate the transfer of redundant data. The VTE may perform compression and/or caching. The VTE may set an upper limit on the amount of data that may be transmitted by a particular client device over a particular time period. The VTE may operate as a network optimizer.

A configuration of a VTE specifies attributes and/or parameters associated with implementing the functionality of the VTE. Different attributes and/or parameters are configured for VTEs with different functionalities. As an example, a VTE may include a firewall functionality. A configuration of the VTE may include a filtering policy for determining which data packets to forward and/or drop by the VTE. As another example, a VTE may be a subnetwork (also referred to as a "subnet"). A configuration of the VTE may be a subnetwork address of the VTE.

A relationship of a particular VTE identifies another VTE (also referred to as a "related VTE") with which the particular VTE is connected. The relationship may include one or more forwarding policies applicable to the particular VTE and the related VTE. A forwarding policy specifies reachability between VTEs. A forwarding policy determines a next hop for a data packet based upon a destination prefix of the data packet and/or other metadata. Other metadata may include a port from which the data packet was received, or a hash value of a particular field of the data packet. The forwarding policy may be applied to Layer 3 transport protocols and/or Layer 2 transport protocols.

A forwarding policy may specify intermediate VTEs to be traversed between a particular VTE and a related VTE. As an example, there may be multiple paths between a source VTE and a destination VTE. One path may include the source VTE, an intermediate VTE A, and the destination VTE. Another path may include the source VTE, an intermediate VTE B, and the destination VTE. A forwarding policy may specify that for a data packet coming from the source VTE and addressed to the destination VTE, the next hop is VTE A. Hence, a data packet would traverse the path including VTE A, instead of the path including VTE B.

A forwarding policy may specify filtering criteria for data packets transmitted between a particular VTE and a related VTE. As an example, VTEs of a virtual topology may include two subnetworks. A relationship between the two subnetworks may include a forwarding policy. The forwarding policy may specify that data packets transmitted between the two subnetworks must first pass through a particular firewall. As another example, VTEs of a virtual topology may include two subnetworks. A relationship between the two subnetworks may include a forwarding policy. The forwarding policy may specify that data packets addressed to a particular address within one of the subnetworks must be dropped.

A forwarding policy applicable to a particular relationship corresponding to a particular VTE may also be applicable to another relationship corresponding to the particular VTE. The forwarding policy is applicable to the other relationship if the other relationship depends on the particular relationship. As an example, a virtual topology may include a relationship between VTE A and VTE B (also referred to as the "VTE A-VTE B relationship"). The VTE A-VTE B relationship may include a forwarding policy requiring that data transmitted between VTE A and VTE B first pass through a firewall VTE. Additionally, the virtual topology may include a relationship between VTE B and VTE C (also referred to as the "VTE B-VTE C relationship"). The VTE B-VTE C relationship may include a forwarding policy that allows all data to be transmitted directly between VTE B and VTE C.

In this example, the VTE A-VTE B relationship and the VTE B-VTE C relationship provides reachability between VTE A and VTE C. VTE A may transmit data to VTE C by first transmitting the data to VTE B, which then forwards the data to VTE C. Hence, the relationship between VTE A and VTE C (also referred to as the "VTE A-VTE C relationship") depends on the VTE A-VTE B relationship.

Continuing this example, VTE A may transmit data to VTE C through VTE B. As the data is transmitted from VTE A to VTE B, the forwarding policy associated with the VTE A-VTE B relationship may be applied. Based on the forwarding policy, VTE A may transmit the data to the firewall VTE. If the data passes the filtering policy of the firewall VTE, then the firewall VTE may transmit the data to VTE B. VTE B may transmit the data to VTE C. In this example, the forwarding policy applicable to the VTE A-VTE B relationship is applicable to the VTE A-VTE C relationship. This example illustrates the transitive nature of forwarding policies with respect to the relationships corresponding to a VTE.

In one or more embodiments, a virtual topology specification 105 is a description of a virtual topology 104. A virtual topology specification 105 describes the VTE characteristics of each VTE in a virtual topology 104. A virtual topology specification 105 may but does not necessarily include any reference to a physical topology 106 and/or digital devices therein. A virtual topology specification 105 may but does not necessarily specify which digital devices of a physical topology 106 perform which functions of which VTEs. The description of the particular arrangement of VTEs may be provided in various forms, such as graphic form 112 and/or code form 114.

A graphic form 112 of a virtual topology specification 105 may include a graph of the VTEs, such as the graph illustrated in FIG. 2A, described below. A graphic form 112 may be specified by user input via a user interface. As an example, a user interface may include drag-and-drop functionality. A user may drag-and-drop a particular VTE to a particular location of a graph presented on the user interface. The user may connect the particular VTE to other VTEs already shown on the graph. The user may configure each VTE through the user interface. Based on the user input, the particular arrangement of the VTE in relation to the other VTEs already shown on the graph is specified.

A code form 114 of a virtual topology specification 105 may include lines of code, commands, or other textual descriptions of the particular arrangement of VTEs. As an example, a particular line of code may specify a name and/or function of a particular VTE. Another line of code may specify a particular arrangement of various VTEs. Code form 114 may be expressed in any computing language, such as XML (Extensible Markup Language), JSON (JavaScript Object Notation), YAML, Java, C++, C, C#, and Python.

In an embodiment, a virtual topology 104 serves as an intermediary state between customer model 102 and physical topology 106. A virtual topology 104 may be a modified and/or simplified version of a customer model 102, while still satisfying the network requirements and/or goals of the customer model 102. In some cases, as described above, a customer model 102 may include various inefficiencies. As an example, a customer model may include redundant paired firewalls in a physical design. A virtual topology may include a single firewall. The single firewall is a VTE in the virtual topology. The virtual topology is specified with the assumption of resiliency. Resiliency is achieved by the nature of the virtual topology. If the VTE implementing the firewall functionality fails, then a new VTE configured to implement the firewall functionality is instantiated. In this example, the virtual topology describes a simplified version of the customer model, while maintaining the firewall functionality of the customer model.

Additionally, a virtual topology 104 may be instantiated on a physical topology 106. During instantiation, VTEs of the virtual topology 104 are mapped to digital devices of the physical topology 106. A single VTE may be mapped to multiple digital devices. Conversely, multiple VTEs may be mapped to a single digital device. A particular digital device mapped to a particular VTE implements the functions corresponding to the particular VTE.

Multiple virtual topologies 104 may be instantiated by a single physical topology 106. As an example, multiple tenants may share a set of digital devices corresponding to a physical topology. Meanwhile, each tenant may desire a different arrangement of VTEs for implementing a computer network that satisfies the tenant's particular network requirements. A different virtual topology may be required for each tenant. The same set of digital devices may be used to instantiate the multiple different virtual topologies.

Additional embodiments and/or examples relating to an instantiated virtual topology 104 are described below with reference to FIGS. 2C-2D.

2.1 An Example of a Virtual Topology

Figure 2A:
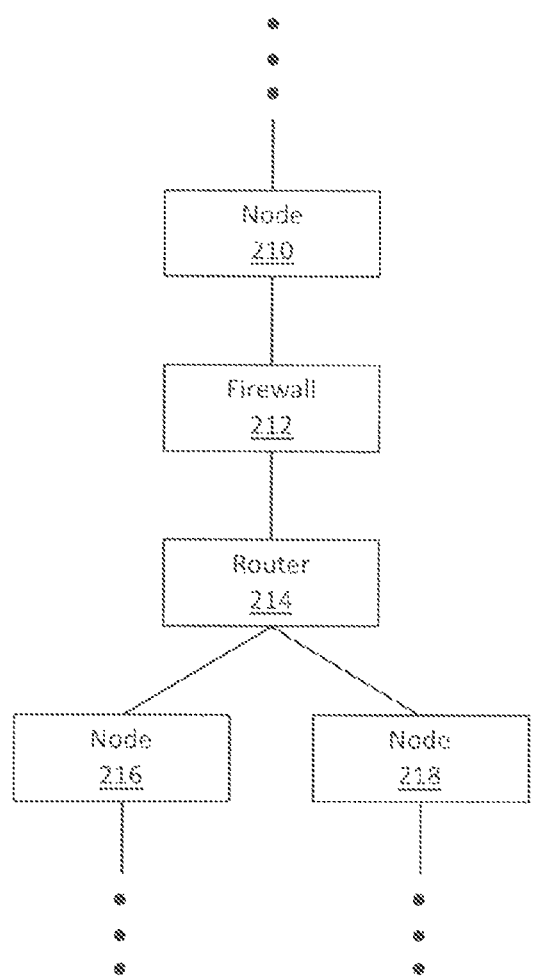
FIG. 2A illustrates an example of a virtual topology specification, in accordance with one or more embodiments.

FIG. 2A illustrates an example of a virtual topology specification, in accordance with one or more embodiments. As illustrated, virtual topology specification 202 includes various VTEs, including node 210, firewall 212, router 214, node 216, and node 218. Virtual topology specification 202 may include more or fewer VTEs than the VTEs illustrated in FIG. 2A. Each VTE is represented as a box. A connection between the VTEs is represented by a line.

In an embodiment, virtual topology specification 202 may be generated by a user submitting user input via a user interface. As an example, the user may be a representative of a customer (e.g., company with data being stored/processed by a cloud network), or a representative of a third party company implementing the computer network. The user may drag-and-drop a VTE to a particular location on a graph presented by the user interface. The user may label the VTE as "node 210." The user may drop-and-drop another VTE to another location on the graph. The user may label the VTE as "firewall 212." The user may add a line connecting node 210 and firewall 212. The user may further specify the functions performed by node 210 and firewall 212. The user may further specify configurations of node 210 and firewall 212.

Virtual topology specification 202 describes how data is supposed to traverse through the VTEs. Data is supposed to traverse through the VTEs according to the connections linking the VTEs. As illustrated, for example, data may be transmitted from node 210 to node 216 by traversing through firewall 212, and router 214. At firewall 212, the data may be processed to implement a firewall functionality associated with firewall 212. Based on the firewall functionality, the data may be inspected to determine whether to allow the data to pass through. Additionally, at router 214, the data may be processed to implement the routing functionality of router 214. Based on the routing functionality, the next hop of the data may be identified as node 216. Router 214 may forward the data to node 216.

2.2 An Example of a Physical Topology

Figure 2B:
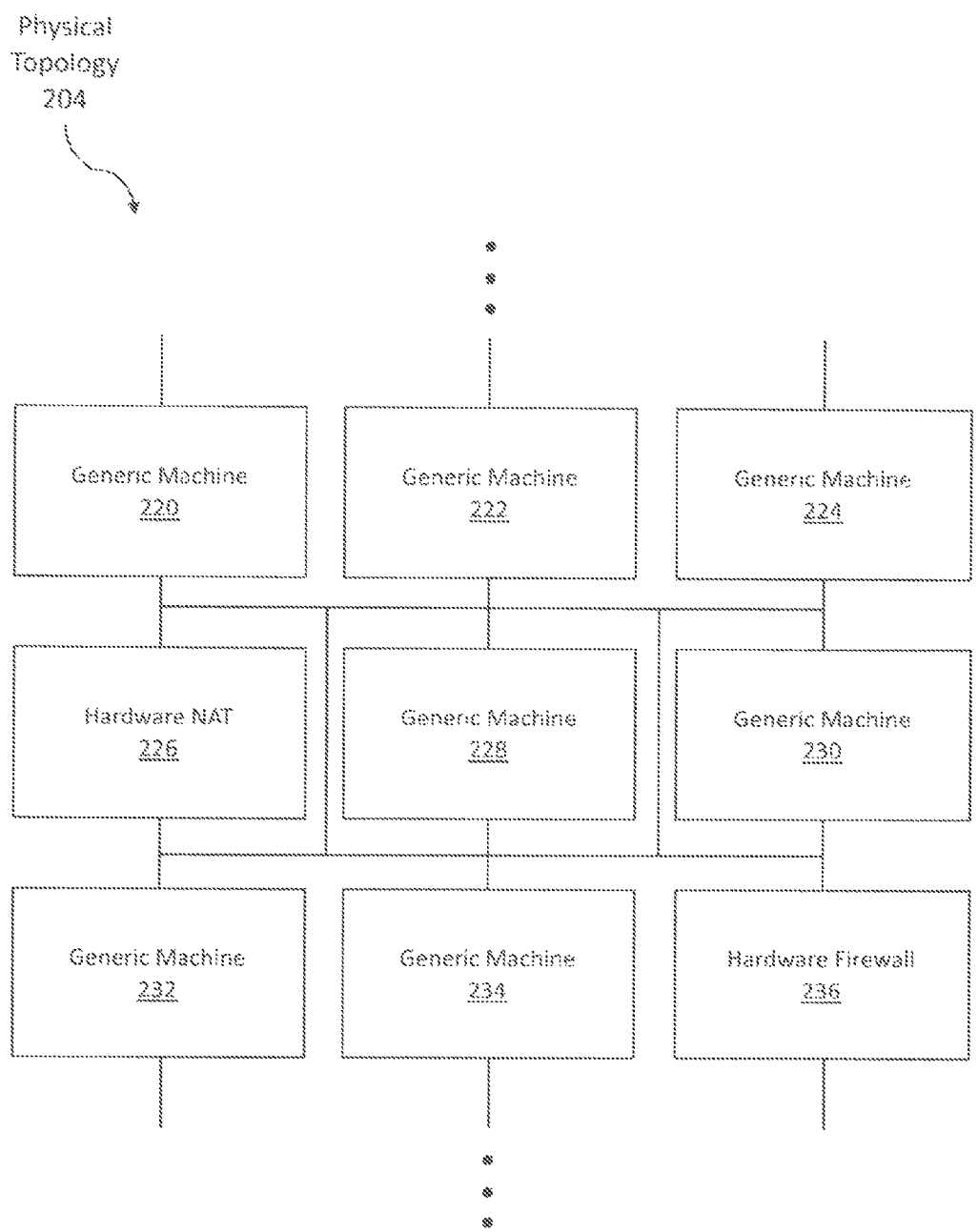
FIG. 2B illustrates an example of a physical topology, in accordance with one or more embodiments.

FIG. 2B illustrates an example of a physical topology, in accordance with one or more embodiments. As illustrated, physical topology 204 includes various digital devices, including generic machines 220-224 and 228-234, hardware NAT 226, and hardware firewall 236. Physical topology 204 may include more or fewer digital devices than the digital devices illustrated in FIG. 2B. Each digital device is represented as a box. Each digital device may be connected to any number of one or more other digital devices within physical topology 204. The digital devices may be located in a single geographical location or distributed across various geographical locations.

In an embodiment, physical topology 204 may correspond to a cloud network. The digital devices shown in physical topology 204 may be shared amongst multiple client devices and/or tenants. A particular digital device may perform a same function for different client devices and/or tenants. A particular digital device may perform different functions for different client devices and/or tenants.

2.3 Instantiation of a Virtual Topology on a Physical Topology

There may be multiple ways to instantiate a virtual topology, described by a same virtual topology specification, on a physical topology. Instantiation of a virtual topology on a physical topology 204 includes mapping VTEs described in a virtual topology specification to digital devices of the physical topology 204.

VTEs in a virtual topology may be executed in an overlay network. The overlay network is implemented on top of an underlay network corresponding to the physical topology. Each VTE is associated with two addresses: (a) an overlay address corresponding to the VTE and (b) an underlay address corresponding to the digital device on which the VTE is instantiated. The addresses may be fixed (for example, entered by a network administrator). Additionally or alternatively, the addresses may be dynamically assigned (for example, by a Dynamic Host Configuration Protocol (DHCP) and/or another application). Data is transmitted between VTEs in a virtual topology by tunneling through the underlying network. Tunneling is further described below with reference to FIG. 2C.

Figure 2C:
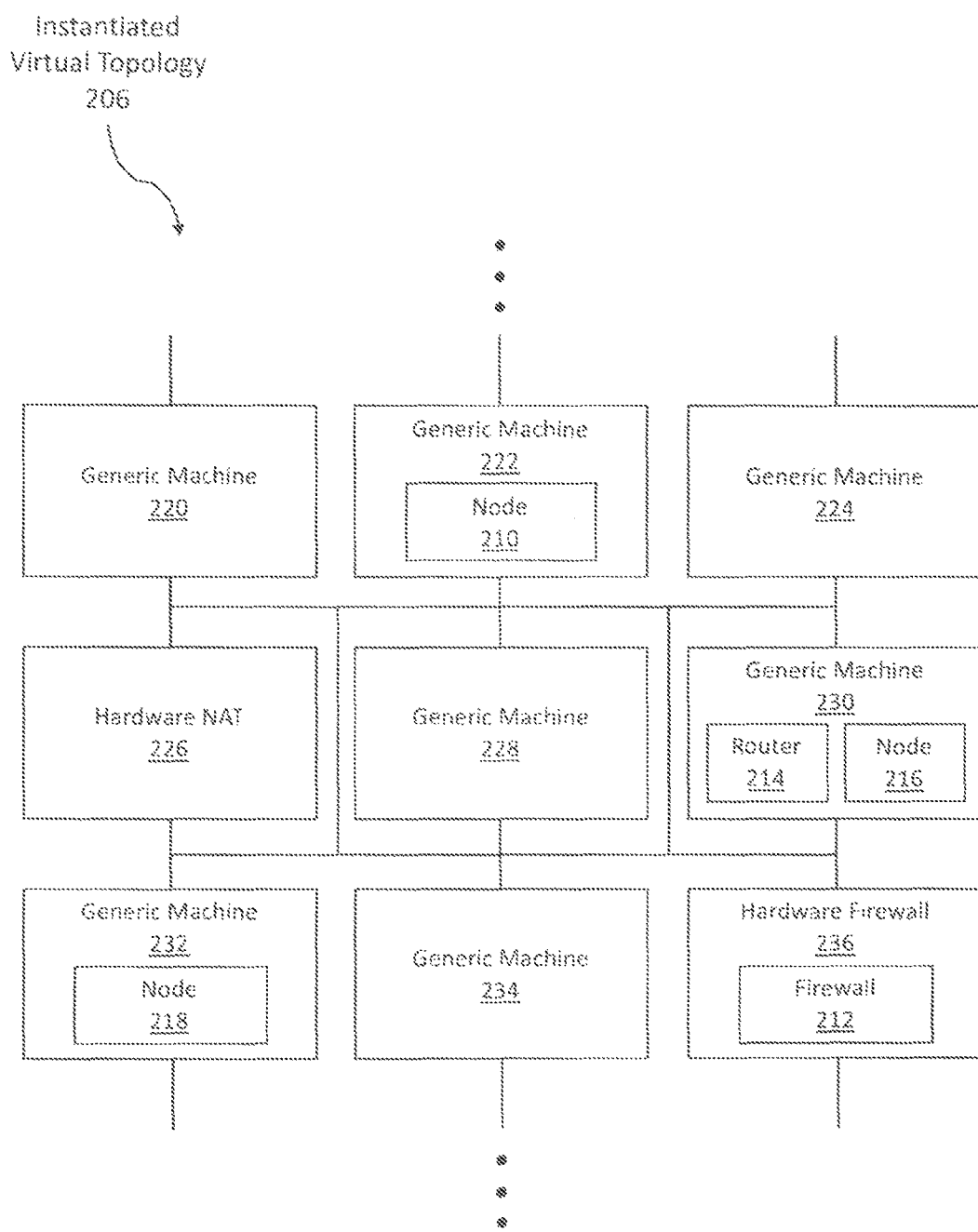
FIGS. 2C-2D illustrate examples of an instantiated virtual topology, in accordance with one or more embodiments.
Figure 2D:
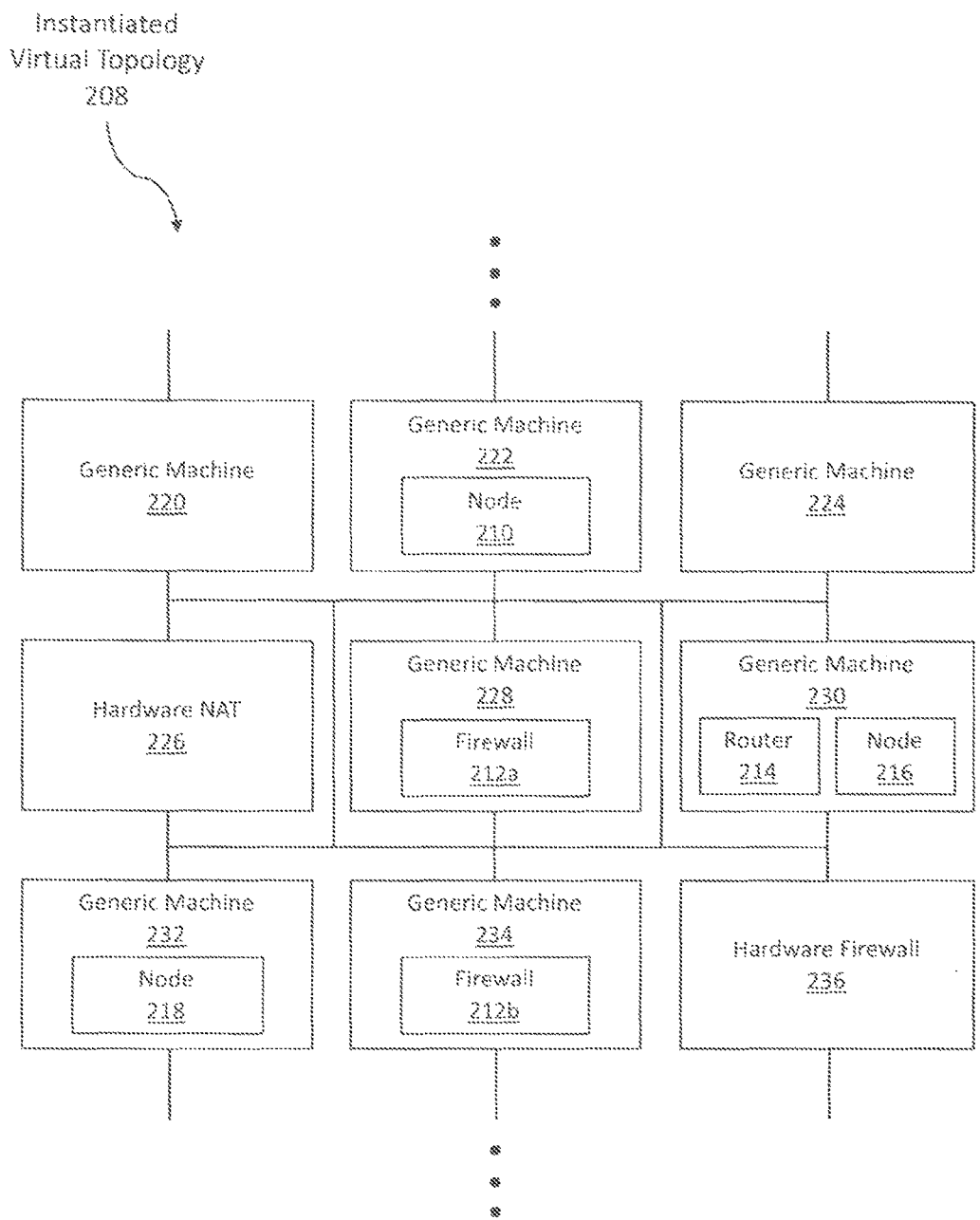

FIG. 2C illustrates an example of an instantiated virtual topology 206, based on virtual topology specification 202 (illustrated in FIG. 2A) and physical topology 204 (illustrated in FIG. 2B).

A generic machine of physical topology 204 executing a virtual machine and/or software application may instantiate a VTE of virtual topology specification 202. As illustrated, generic machine 222 instantiates node 210. Generic machine 232 instantiates node 218.

A function-specific hardware device of physical topology 204 may instantiate a VTE of virtual topology specification 202. As illustrated, hardware firewall 236 instantiates firewall 212.

A single digital device of physical topology 204 may instantiate multiple VTEs of virtual topology specification 202. The digital device may instantiate multiple VTEs using multiple virtual machines, containers, and/or software applications. Alternatively, the digital device may instantiate multiple VTEs using a single virtual machine and/or software application. As illustrated, generic machine 230 instantiates router 214 and node 216. Router 214 and node 216 may be executed by separate virtual machines and/or software applications executing on generic machine 230. Alternatively, router 214 and node 216 may be executed by a same virtual machine and/or software application executing on generic machine 230.

The following is an example of the traversal of components in the transmission of data from node 210 to either node 216 or node 218. Initially, node 210 of generic machine 222 transmits the data to firewall 212 implemented by hardware firewall 236. Firewall 212 transmits the data to router 214 of generic machine 230. Based on a determination made by router 214, router 214 transmits the data to either node 216 of generic machine 230 or node 218 of generic machine 232.

As data is transmitted between VTEs, the data is tunneled through the underlying network corresponding to the physical topology 204. Each VTE is associated with an encapsulation-decapsulation network interface card (also referred to herein as an "encap-decap NIC"). An encap-decap NIC includes encapsulation mappings for VTEs in the virtual topology. An encapsulation mapping for a VTE includes (a) an overlay address corresponding to a VTE and (b) an underlay address that may be used to transmit data via the underlying network to the overlay address. The underlay address may be an address of a digital device that instantiates the VTE. Alternatively, the underlay address may be a next hop for forwarding data towards the VTE.

Referring to the illustrated example, node 210 generates data addressed to node 216 using the overlay address of node 216. An encap-decap NIC associated with node 210 receives the data. The encap-decap NIC determines that the data is addressed to the overlay address of node 216. The encap-decap NIC determines the underlay address of the next hop for forwarding the data towards node 216, which is the underlay address of firewall 212. The encap-decap NIC encapsulates the data using the underlay address of firewall 212. The encap-decap NIC transmits the encapsulated data to firewall 212.

An encap-decap NIC associated with firewall 212 receives and decapsulates the encapsulated data. The encap-decap NIC determines that the data is addressed to the overlay address of node 216. The encap-decap NIC determines the underlay address of the next hop for forwarding the data towards node 216, which is the underlay address of router 214. The encap-decap NIC encapsulates the data using the underlay address of router 214. The encap-decap NIC transmits the encapsulated data to router 214.

An encap-decap NIC associated with router 214 receives and decapsulates the encapsulated data. The encap-decap NIC determines that the data is addressed to the overlay address of node 216. The encap-decap NIC determines the underlay address of the next hop for forwarding the data towards node 216, which is the underlay address of node 216. The encap-decap NIC encapsulates the data using the underlay address of node 216. The encap-decap NIC transmits the encapsulated data to node 216.

FIG. 4B illustrates another example of an instantiated virtual topology 208, based on virtual topology specification 202 (illustrated in FIG. 2A) and physical topology 204 (illustrated in FIG. 2B). This example illustrates instantiating a single VTE of virtual topology specification 202 onto multiple digital devices of physical topology 204. The single VTE is referred to as being "distributed to" multiple digital devices.

Instantiated virtual topology 208 is similar to instantiated virtual topology 206, except that the instantiation of firewall 212 is different. In instantiated virtual topology 208, firewall 212 is distributed to generic machine 228 and generic machine 234. Each of firewall 212a and firewall 212b is a distributed element of firewall 212.

Data being processed by the computer network does not necessarily traverse all of the distributed elements of a single VTE. Data being processed by the computer network does not necessarily traverse various VTEs in a same order as indicated in the virtual topology specification 200. The following is an example of the traversal of components in the transmission of data from node 210 to either node 216 or node 218. Initially, node 210 of generic machine 222 transmits the data to firewall 212a of generic machine 228. Firewall 212a transmits the data to router 214 of generic machine 230. Based on a determination made by router 214, router 214 transmits the data to either (a) firewall 214b of generic machine 234 or (b) node 218 of generic machine 232. If firewall 214b receives the data, firewall 214b transmits the data to node 216 of generic machine 230. As illustrated in this example, firewall 212a, router 214, and firewall 212b are traversed between node 210 and node 216. Alternatively, firewall 212a, and router 214 are traversed between node 210 and node 218.

Distribution of a single VTE across multiple digital devices may be performed to increase performance and/or efficiency of a computer network. As an example, virtual topology specification 202 may specify the following functions for firewall 212:

(a) Reject data that has a source IP address of Address X;
(b) If the destination of the data is node 216, reject data that includes Data Y.

Function (b) is only executed for a subset of data that traverses firewall 214. Specifically, function (b) is executed only for data addressed to node 216.

If firewall 212 is not distributed to multiple digital devices, then the single digital device that instantiates firewall 212 needs to perform all of functions (a) and (b) on any data that traverses firewall 212. Firewall 212 needs to determine whether any data has a source IP address of Address X. Firewall 212 needs to determine whether the data is addressed to node 216, and if yes, whether the data includes Data Y.

In contrast to the above example, distributing firewall 212 to multiple digital devices would require firewall 212a of generic machine 228 to only perform function (a) on a set of data that traverses firewall 212a. Thereafter, firewall 212a transmits the set of data to router 214 of generic machine 230. Router 214 routes a subset of data, addressed to node 216, to firewall 212b. Router 214 routes a subset of data, addressed to node 218, to node 218. As an inherent part of the routing functionality, router 214 identifies the data for which function (b) is applicable (that is, data addressed to node 216). Based on the determination made by router 214, router 214 transmits a subset of data to either firewall 212b or node 218. Firewall 212b need only perform function (b) for the subset of data routed to firewall 212b. Hence, firewalls 212a and 212b operate in a distributed manner to increase performance and/or efficiency of the computer network.

3. Virtual Topology Deployment System Architecture

Figure 3:
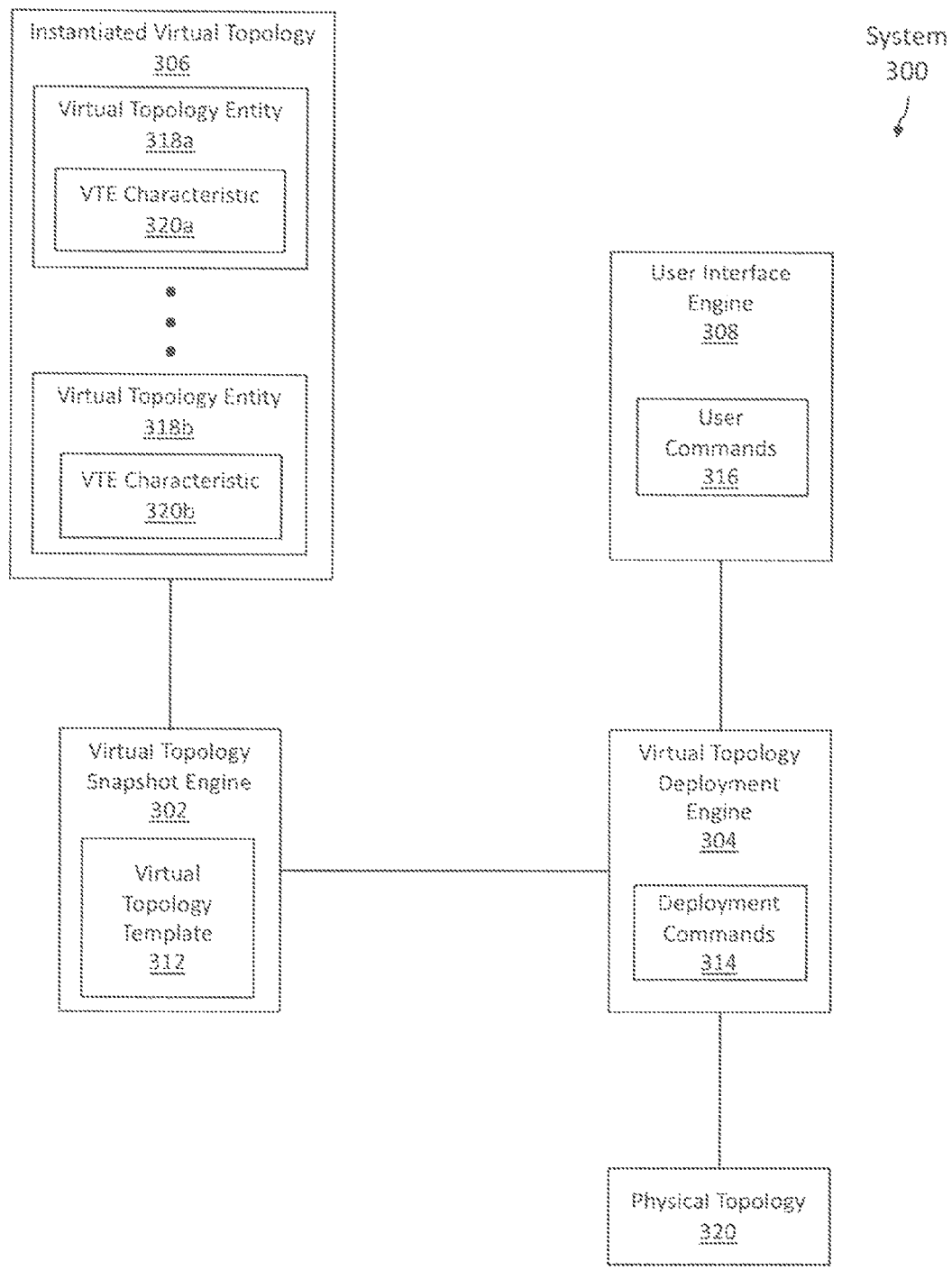
FIG. 3 illustrates a virtual topology deployment system, in accordance with one or more embodiments.

FIG. 3 illustrates a virtual topology deployment system, in accordance with one or more embodiments. As illustrated in FIG. 3, virtual topology deployment system 300 includes a virtual topology snapshot engine 302, a virtual topology deployment engine 304, an instantiated virtual topology 306, a user interface engine 308, and a physical topology 320. In one or more embodiments, virtual topology deployment system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component.

In one or more embodiments, an instantiated virtual topology 306 is a virtual topology that is instantiated on a physical topology, in accordance with a virtual topology description. The VTEs (such as VTE 318a-318b) in the instantiated virtual topology 306 are specified in the virtual topology description. Each VTE is associated with one or more VTE characteristics (such as VTE characteristic 230a-230b), as described above.

In one or more embodiments, a physical topology 320 is a particular arrangement of digital devices of a computer network. The computer network may provide connectivity between clients and network resources, as described above. The computer network may be shared amongst multiple tenants, as described above.

In one or more embodiments, a virtual topology snapshot engine 302 (also referred to as a "snapshot engine") refers to hardware and/or software configured to generate a virtual topology template 312 based on an instantiated virtual topology 306. Examples of operations for generating a virtual topology template 312 are described below with reference to FIG. 4.

A virtual topology template 312 is a description of a particular arrangement of VTEs of an instantiated virtual topology 306. A virtual topology template 312 includes description of the VTE characteristics of each VTE in the instantiated virtual topology 306. The description of the particular arrangement of VTEs may be provided in various forms, such as graphic form and/or code form.

The virtual topology template 312 generated from a particular instantiated virtual topology 306 may be the same as a virtual topology specification 105 from which the particular instantiated virtual topology 306 was deployed. Alternatively, the virtual topology template 312 generated from a particular instantiated virtual topology 306 may be different from a virtual topology specification from which the particular instantiated virtual topology 306 was deployed.

As an example, a virtual topology 306 may be instantiated based on a virtual topology specification. Thereafter, the virtual topology 306 may be modified based on user commands 316. In this example, a virtual topology template 312 generated based on the modified virtual topology 306 is different from the virtual topology specification. The virtual topology template 312 and the virtual topology specification describe different virtual topologies.

As another example, a virtual topology 306 may be instantiated based on a virtual topology specification that is provided in a graphic form. A virtual topology template 312 may be generated, based on the virtual topology 306, in a code form. In this example, the virtual topology template 312 and the virtual topology specification describe a same virtual topology but are associated with different formats.

In one or more embodiments, a virtual topology deployment engine 304 (also referred to as a "deployment engine") refers to hardware and/or software configured to execute deployment commands 314 to instantiate a virtual topology on a physical topology 320. Instantiating a virtual topology may also be referred to as "deploying a virtual topology."

Examples of operations for deploying a virtual topology are described below with reference to FIG. 5.

Deployment commands 314 are instructions executed by a deployment engine 304 for instantiating a virtual topology on a physical topology 320. Deployment commands 314 include instructions specifying the VTEs in the virtual topology. Deployment commands 314 include instructions specifying the VTE characteristics corresponding to the VTEs in the virtual topology. Different deployment commands 314 may be used to instantiate a same virtual topology for different physical topologies 320. Deployment commands 314 may be expressed in human-readable and/or machine-readable form.

In one or more embodiments, a virtual topology template 312 and/or deployment commands 314 are stored at a data repository. A virtual topology template 312 and deployment commands 314 may be stored at a same data repository or different data repositories. A data repository is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site.

The data repository may be implemented or may execute on the same computing system as snapshot engine 302 and/or deployment engine 304. Alternatively or additionally, the data repository may be implemented or executed on a computing system separate from snapshot engine 302 and/or deployment engine 304. The data repository may be communicatively coupled to from snapshot engine 302 and/or deployment engine 304 via a direct connection or via a network.

In one or more embodiments, a user interface engine 308 refers to hardware and/or software configured to present a user interface and receive user input via the user interface. As an example, a user interface engine may render a graphical user interface (GUI) including various interface elements. The user interface engine may receive user input via an interface element. Examples of user interfaces include a graphical user interface (GUI), a command line interface (CLI), a haptic interface, and a voice command interface. Examples of interface elements include checkboxes, radio buttons, dropdown lists, list boxes, buttons, toggles, text fields, date and time selectors, command lines, sliders, pages, and forms.

User commands 316 are commands that are received as user input via user interface engine 308. User commands 316 provide instructions for instantiating a virtual topology. User commands 316 may but does not necessarily include any reference to a physical topology 320 and/or digital devices therein. User commands 316 may but does not necessarily specify which digital devices of a physical topology 320 perform which functions of which VTEs. User commands 316 may be provided in various forms, such as graphic form and/or code form. User commands 316 may be used to instantiate a new virtual topology onto a physical topology 320. Additionally or alternatively, user commands 316 may be used to modify an existing instantiated virtual topology 306.

Snapshot engine 302, deployment engine 304, and/or user interface engine 308 are implemented on one or more digital devices. Snapshot engine 302, deployment engine 304, and/or user interface engine 308 may be implemented on a same digital device or different digital devices. In an embodiment, snapshot engine 302, deployment engine 304, and/or user interface engine 308 are a same component that performs the respective functions as described above.

4. Snapshotting a Virtual Topology

Figure 4:
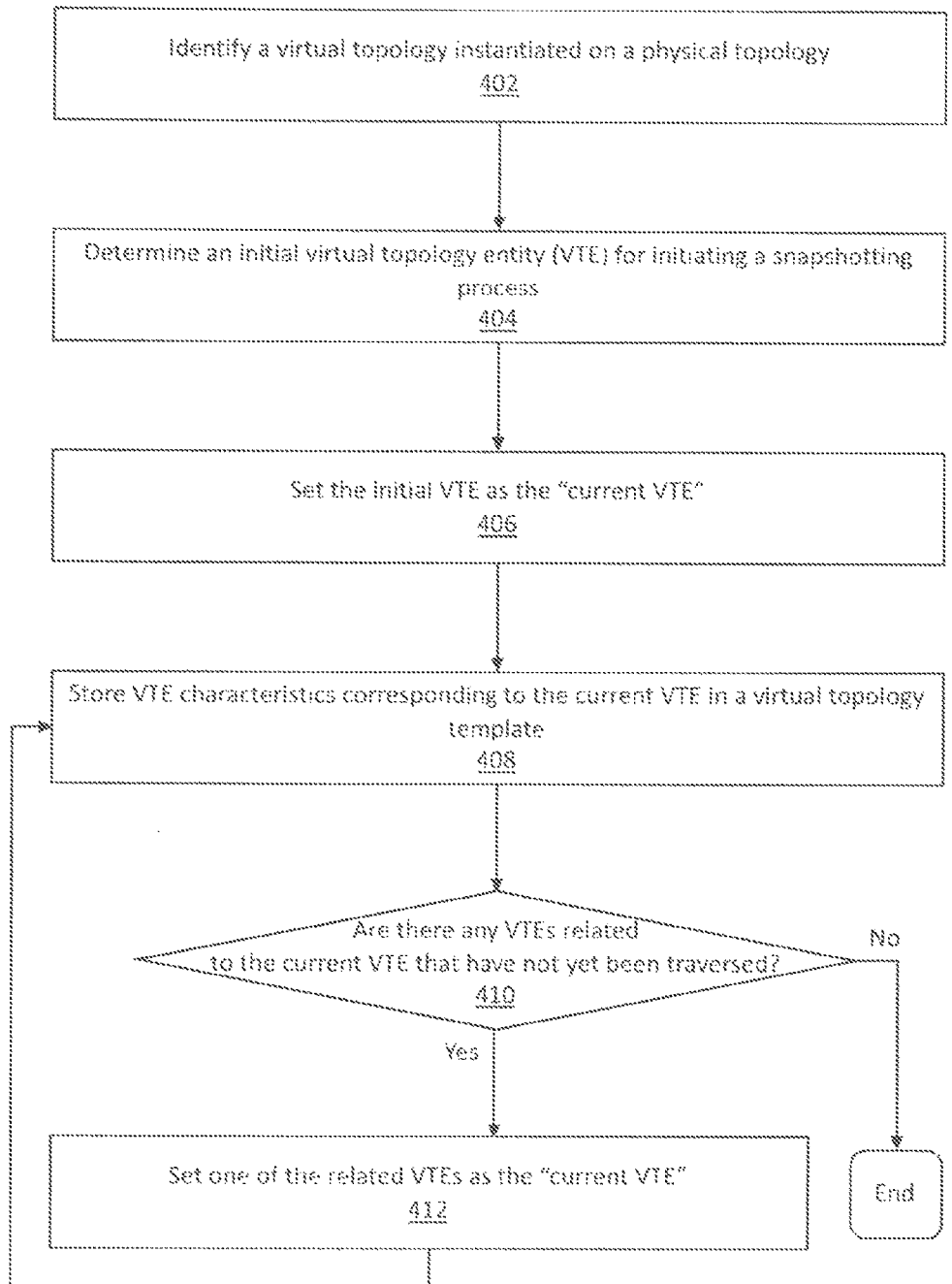
FIG. 4 illustrates an example set of operations for snapshotting an instantiated virtual topology, in accordance with one or more embodiments.

FIG. 4 illustrates an example set of operations for snapshotting an instantiated virtual topology, in accordance with one or more embodiments.

One or more embodiments include identifying a virtual topology instantiated on a physical topology (Operation 402). A snapshot engine 302 identifies the instantiated virtual topology based on user input and/or another application.

As an example, the instantiated virtual topology may be a virtual topology that is known to satisfy certain network requirements. A tenant may desire to duplicate the instantiated virtual topology at different locations. A user may enter user input including an identifier of the instantiated virtual topology. Based on the identifier of the instantiated virtual topology, a snapshot engine may identify the instantiated virtual topology for snapshotting.

One or more embodiments include determining an initial VTE for initiating a snapshotting process (Operation 404). The snapshot engine 302 determines the initial VTE based on user input and/or another application. The initial VTE is one of the VTEs in the instantiated virtual topology. As an example, user input including an address and/or other identifier of the initial VTE may be received.

One or more embodiments include setting the initial VTE as the "current VTE" (Operation 406). The initial VTE is the first VTE that is traversed in the snapshotting process.

One or more embodiments include storing VTE characteristics corresponding to the current VTE in a virtual topology template (Operation 408). The snapshot engine 302 identifies the VTE characteristics corresponding to the current VTE. The snapshot engine 302 may query the current VTE for the VTE characteristics. The current VTE may respond with the VTE characteristics. Additionally or alternatively, the snapshot engine 302 may query a virtual topology manager that manages the instantiated virtual topology. The virtual topology manager may be coupled to a data repository including information related to the current VTE. The virtual topology manager may respond with the VTE characteristics. The VTE characteristics may include a functionality, configuration, and/or relationship corresponding to the current VTE.

The snapshot engine 302 stores the VTE characteristics in a virtual topology template. The snapshot engine 302 may store the VTE characteristics of each VTE in a virtual topology template as each VTE is traversed. Additionally or alternatively, the snapshot engine 302 may aggregate the VTE characteristics of each traversed VTE in a temporary memory location. The snapshot engine 302 may generate a virtual topology template including the aggregated VTE characteristics.

The snapshot engine 302 may store the VTE characteristics in a virtual topology template in any format. As an example, the snapshot engine 302 may generate a JSON object to store the VTE characteristics of each VTE. The snapshot engine 302 may store the JSON objects corresponding to the VTEs in a virtual topology template. As another example, the snapshot engine 302 may generate commands corresponding to each VTE. One command may specify the VTE characteristics of a particular VTE. Another command may specify the VTE characteristics of another VTE. The snapshot engine stores the set of commands corresponding to the VTEs in a virtual topology template.

One or more embodiments include determining whether there are any VTEs related to the current VTE that have not yet been traversed (Operation 410). The snapshot engine 302 identifies the VTEs related to the current VTE based on the relationships of the current VTE. As an example, a snapshot engine 302 may identify a relationship corresponding to the current VTE. The snapshot engine 302 may determine that the relationship is between the current VTE and a firewall VTE. The snapshot engine may 102 may determine that the firewall VTE is related to the current VTE.

The snapshot engine 302 determines whether a related VTE has already been traversed. The snapshot engine 302 may maintain a list of VTEs already traversed. If the related VTE is included in the list, then the snapshot engine 302 determines that the related VTE has been traversed. Alternatively, the snapshot engine 302 may search through the virtual topology template generated thus far to determine whether the related VTE is included. If the related VTE is included in the virtual topology template generated thus far, then the snapshot engine 302 determines that the related VTE has been traversed.

If all related VTEs have been traversed, then the process ends. Alternatively, if there are related VTEs that have not yet been traversed, then the process continues to Operation 412 to iterate the process with respect to the related VTEs that have not yet been traversed.

One or more embodiments include setting one of the related VTEs as the "current VTE" (Operation 412). The snapshot engine 302 iterates Operations 408-410 with respect to the current VTE. Hence, the snapshot engine 302 recursively traverses each VTE in the instantiated virtual topology.

In an embodiment, the snapshotting process may include one or more nested loops. Operations 408-410 are recursively iterated with respect to each related VTE that has not yet been traversed. As an example, an instantiated virtual topology may include a router VTE connected to (a) a firewall VTE and (b) a subnet VTE. In a snapshotting process, a snapshot engine may identify the router VTE as a current VTE. The snapshot engine may store the VTE characteristics of the router VTE in a virtual topology template. The snapshot engine may identify the firewall VTE and the subnet VTE as related VTEs that have not yet been traversed.

The snapshot engine may first iterate the snapshotting process with respect to the firewall VTE. The snapshot engine may set the firewall VTE as the current VTE. The snapshot engine may store the VTE characteristics of the firewall VTE in the virtual topology template. The snapshot engine may identify a particular VTE related to the firewall VTE. The snapshot engine may iterate the snapshotting process with respect to the particular VTE.

Subsequently, the snapshot engine may reiterate the snapshotting process with respect to the subnet VTE. The snapshot engine may set the subnet VTE as the current VTE. The snapshot engine may store the VTE characteristics of the subnet VTE in the virtual topology template. The snapshot engine may identify a particular VTE related to the subnet VTE. The snapshot engine may iterate the snapshotting process with respect to the particular VTE.

In an embodiment, the snapshotting process is implemented using a stack. The snapshot engine 302 processes each item on the stack on a first-in-last-out basis. The snapshot engine 302 pushes onto a stack each related VTE that has not yet been traversed. The snapshot engine 302 pops the last item off the stack for processing if there are no additional non-traversed related VTEs to be stored onto the stack.

As an example, an instantiated virtual topology may include a router VTE connected to (a) a firewall VTE and (b) a subnet VTE. The firewall VTE may further be connected to a NAT VTE. In a snapshotting process, a snapshot engine may identify the router VTE as a current VTE. The snapshot engine may identify the firewall VTE and the subset VTE as related VTEs that have not yet been traversed. The snapshot engine may push the firewall VTE onto the stack. The snapshot engine may push the subnet VTE onto the stack.

At this point, there are no additional non-traversed related VTEs to be stored onto the stack. The snapshot engine may pop the last item off the stack for processing. The last item corresponds to the subnet VTE.

The snapshot engine may set the subnet VTE as the current VTE. The snapshot engine may store the VTE characteristics of the subnet VTE in the virtual topology template. The snapshot engine may identify the NAT VTE as a non-traversed VTE related to the subnet VTE. The snapshot engine may push the NAT VTE onto the stack.

At this point, there are no additional non-traversed related VTEs to be stored onto the stack. The snapshot engine may pop the last item off the stack for processing. The last item corresponds to the NAT VTE.

The snapshot engine may set the NAT VTE as the current VTE. The snapshot engine may store the VTE characteristics of the NAT VTE in the virtual topology template. The snapshot engine may determine that all VTEs related to the NAT VTE have been traversed.

At this point, there are no additional non-traversed related VTEs to be stored onto the stack. The snapshot engine may pop the last item off the stack for processing. The last item corresponds to the firewall VTE.

The snapshot engine may set the firewall VTE as the current VTE. Iterating the above process, the snapshot engine continues traversing each VTE until there are no other items remaining on the stack.

In an embodiment, various travel algorithms may be used to traverse each VTE in an instantiated virtual topology. Examples of traversal algorithms include a breadth-first algorithm and a depth-first algorithm. As an example, an instantiated virtual topology may include a router VTE connected to (a) a firewall VTE and (b) a subnet VTE. The firewall VTE may further be connected to a NAT VTE.

The following describes the traversal of VTEs, in the above-described instantiated virtual topology, based on a breadth-first algorithm. At Operation 406, a snapshot engine may identify the router VTE, which is the initial VTE, as a current VTE. At Operation 410, the snapshot engine may identify the firewall VTE as the current VTE. At the reiteration of Operation 410, the snapshot engine may identify the subnet VTE as the current VTE. At the reiteration of Operation 410, the snapshot engine may identify the NAT VTE as the current VTE.

The following describes the traversal of VTEs, in the above-described instantiated virtual topology, based on a depth-first algorithm. At Operation 406, a snapshot engine may identify the router VTE, which is the initial VTE, as a current VTE. At Operation 410, the snapshot engine may identify the firewall VTE as the current VTE. At the reiteration of Operation 410, the snapshot engine may identify the NAT VTE as the current VTE. At the reiteration of Operation 410, the snapshot engine may identify the subnet VTE as the current VTE.

5. Instantiating a Virtual Topology

Figure 5:
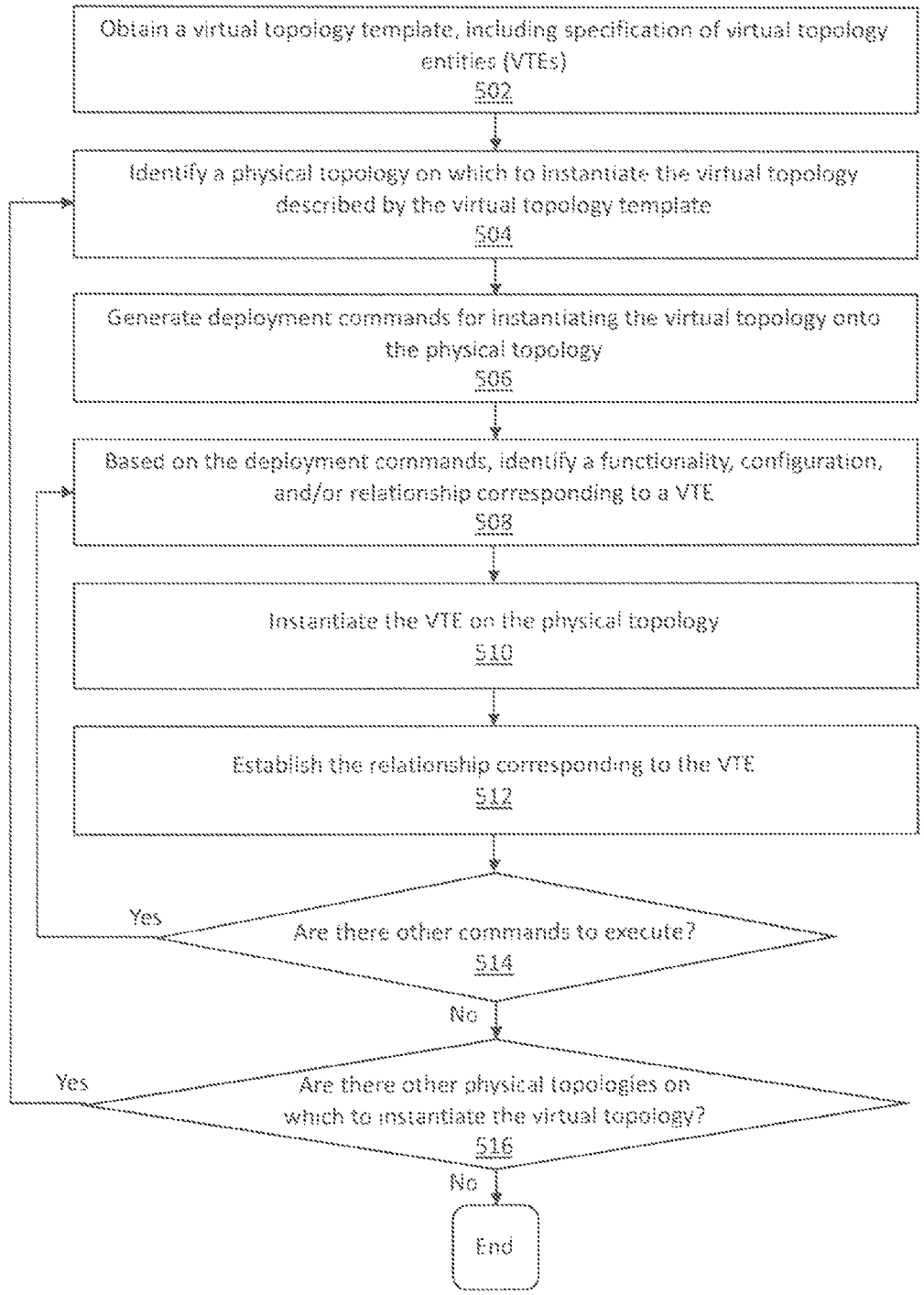
FIG. 5 illustrates an example set of operations for instantiating a virtual topology onto a physical topology, in accordance with one or more embodiments.

FIG. 5 illustrates an example set of operations for instantiating a virtual topology onto a physical topology, in accordance with one or more embodiments.

One or more embodiments include obtaining a virtual topology template, including specification of VTEs (Operation 502). In an embodiment, the virtual topology template specifies at least two VTEs with a corresponding relationship between the at least two VTEs. A deployment engine 304 may obtain the virtual topology template via user input and/or from another application. The virtual topology template includes specification of VTEs, including VTE characteristics. As an example, a user may desire to use a virtual topology template to duplicate a virtual topology at multiple locations. Deployment engines corresponding to the multiple locations may receive user input, entered by the user, including the virtual topology template.

Additionally or alternatively, the deployment engine 304 obtains user commands via a user interface. The user commands include instructions for instantiating VTEs. The user commands specify VTE characteristics of each VTE.

One or more embodiments include identifying a physical topology on which to instantiate the virtual topology described by the virtual topology template (Operation 504). The deployment engine 304 identifies the physical topology via user input and/or from another application. As an example, a physical topology manager may manage a physical topology corresponding to the digital devices at a particular location. The physical topology manager may transmit information identifying and/or describing the physical topology to a deployment engine.

One or more embodiments include generating deployment commands for instantiating the virtual topology onto the physical topology (Operation 506). The deployment engine 304 generates the deployment commands based on the virtual topology template and the physical topology. The deployment engine 304 maps each VTE in the virtual topology template to one or more digital devices in the physical topology. The deployment engine 304 generates deployment commands to instantiate each VTE onto the mapped digital devices. The deployment commands include specification of the VTE characteristics of each VTE.

One or more embodiments include identifying a functionality, configuration, and/or relationship corresponding to a VTE based on the deployment commands (Operation 508). The deployment engine 304 identifies the VTE characteristics of the VTE based on the deployment commands. The VTE characteristics include a functionality, configuration, and/or relationship corresponding to the VTE.

One or more embodiments include instantiating the VTE on the physical topology (Operation 510). The deployment engine 304 executes the deployment commands to instantiate the VTE, identified at Operation 508, onto one or more digital devices. The deployment engine 304 may instantiate the VTE on a particular digital device based on a mapping, between the VTE and the particular digital device, specified by the deployment commands. Additionally or alternatively, the deployment engine 304 may instantiate the VTE on a particular digital device based on the loads, capacities, and/or functionalities of the digital devices in the physical topology. If a digital device is a generic machine, the deployment engine may cause the generic machine to execute a virtual machine, container, and/or software application configured to implement the functionality of the VTE. Additionally, the deployment engine 304 causes execution of an encap-decap NIC associated with the VTE. The encap-decap NIC is configured to transmit data to and from the VTE via the underlying network using encapsulation mappings.

The deployment engine 304 configures a digital device, on which a VTE is instantiated, based on the configuration of the VTE. As an example, a virtual topology template may include a firewall VTE configured to drop traffic addressed to a particular destination. A deployment engine may initiate a virtual machine on a generic machine in a physical topology. The deployment engine may enable a firewall functionality on the virtual machine. The deployment engine may configure the firewall functionality to drop traffic addressed to the particular destination.

One or more embodiments include establishing the relationship corresponding to the VTE (Operation 512). The deployment engine 304 identifies the relationship corresponding to the VTE identified at Operation 508. The relationship includes the VTE identified at Operation 508 and another VTE (also referred to as a "related VTE"). The deployment engine 304 establishes the relationship as specified by the deployment commands, which are generated based on the virtual topology template. In an embodiment, the virtual topology template and/or the deployment commands specify one or more forwarding policies associated with the relationship. The forwarding policies govern the transmission of data between the VTE and the related VTE. The deployment engine 304 executes an interface between the VTE and the related VTE to implement the forwarding policies.

In an embodiment, a forwarding policy may specify that data is to be directly transmitted between the VTE and the related VTE. The interface may implement the forwarding policy by allowing encapsulation mappings to be shared across the VTE and the related VTE, as illustrated in the following example.

As an example, a virtual topology may include a relationship between a subnet VTE and a NAT VTE. A forwarding policy applicable to the subnet VTE and the NAT VTE may specify that data is transmitted directly between the subnet VTE and the NAT. A deployment engine may instantiate the subnet VTE and the NAT VTE, including the respective encap-decap NICs.

Continuing the example, the deployment engine may execute an interface between the subnet VTE and the NAT VTE. Based on the interface, an encapsulation mapping for the subnet VTE may be shared with the encap-decap NIC associated with the NAT VTE. Hence, the encapsulation mapping between (a) an overlay address of the subnet VTE and (b) an underlay address of the digital device executing the subnet VTE may be stored in a data repository accessible by the encap-decap NIC associated with the NAT VTE. Conversely, an encapsulation mapping for the NAT VTE may be shared with the encap-decap NIC associated with the subnet VTE. Hence, the encapsulation mapping between (a) an overlay address of the NAT VTE and (b) an underlay address of the digital device executing the NAT VTE may be stored in a data repository accessible by the encap-decap NIC associated with the subnet VTE.

In an embodiment, a forwarding policy may specify intermediate VTEs to be traversed between the VTE and the related VTE. The interface may implement the forwarding policy by modifying encapsulation mappings, as illustrated in the following example.

As an example, a virtual topology may include a relationship between a subnet VTE and a NAT VTE. A forwarding policy applicable to the subnet VTE and the NAT VTE may specify that data transmitted from the subnet VTE to the NAT VTE must first pass through an intermediate firewall VTE. A deployment engine may instantiate the subnet VTE and the NAT VTE, including the respective encap-decap NICs.

Continuing the example, the deployment engine may execute an interface between the subnet VTE and the NAT VTE. Based on the interface, an encapsulation mapping for the NAT VTE may be modified. A typical encapsulation mapping for the NAT VTE may be a mapping between (a) an overlay address of the NAT VTE and (b) an underlay address of the digital device executing the NAT VTE. However, the modified encapsulation mapping for the NAT VTE may be a mapping between (a) an overlay address of the NAT VTE and (b) an underlay corresponding to a digital device executing the firewall VTE. The modified encapsulation mapping may be stored in a data repository accessible by the encap-decap NIC associated with the subnet VTE. Using the modified encapsulation mapping for the NAT VTE for transmitting data that is addressed to the NAT VTE, the encap-decap NIC associated with the subnet VTE transmits the data to the firewall VTE.

In an embodiment, a forwarding policy may specify filtering criteria for data packets transmitted between a particular VTE and a related VTE. The interface may implement the forwarding policy by controlling which data packets are encapsulated for transmission via underlying network, as illustrated in the following example.

As an example, a virtual topology may include a relationship between a subnet VTE and a NAT VTE. A forwarding policy applicable to the subnet VTE and the NAT VTE may specify that data transmitted from the subnet VTE to a particular port of the NAT VTE must be dropped. A deployment engine may instantiate the subnet VTE and the NAT VTE, including the respective encap-decap NICs.

Additionally, the deployment engine may execute an interface between the subnet VTE and the NAT VTE. The interface may control which data packets are encapsulated by the encap-decap NIC associated with the subnet VTE. The encap-decap NIC associated with the subnet VTE may determine whether a data packet is addressed to the particular port of the NAT VTE prior to encapsulating the data packet. If the data packet is addressed to the particular port of the NAT VTE, then the encap-decap NIC associated with the subnet VTE does not encapsulate the data packet. The data packet may be dropped. If the data packet is not addressed to the particular port of the NAT VTE, then the encap-decap NIC associated with the subnet VTE encapsulates the data packet using the encapsulation mapping for the NAT VTE. The encapsulated data packet may be sent towards the NAT VTE via the underlying network.

One or more embodiments include determining whether there are any other commands to execute (Operation 514). If there are other commands to execute, then the deployment engine 304 iterates Operations 508-514 with respect to the other commands. Based on iterations of Operations 508-514, each VTE is instantiated on the physical topology in accordance with the virtual topology template.

One or more embodiments include determining whether there are any other physical topologies on which to instantiate the virtual topology (Operation 516). The deployment engine 304 determines whether there are other physical topologies on which to instantiate the virtual topology based on user input and/or another application. If there is another physical topology on which to instantiate the virtual topology, then the deployment engine 304 iterates Operations 504-516 with respect to the other physical topology. By iterating Operations 504-516 with respect to multiple physical topologies, a single virtual topology template may be used to deploy a same virtual topology onto the multiple physical topologies. Additionally or alternatively, a same set of user commands may be used to deploy a same virtual topology onto the multiple physical topologies.

6. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 6A:
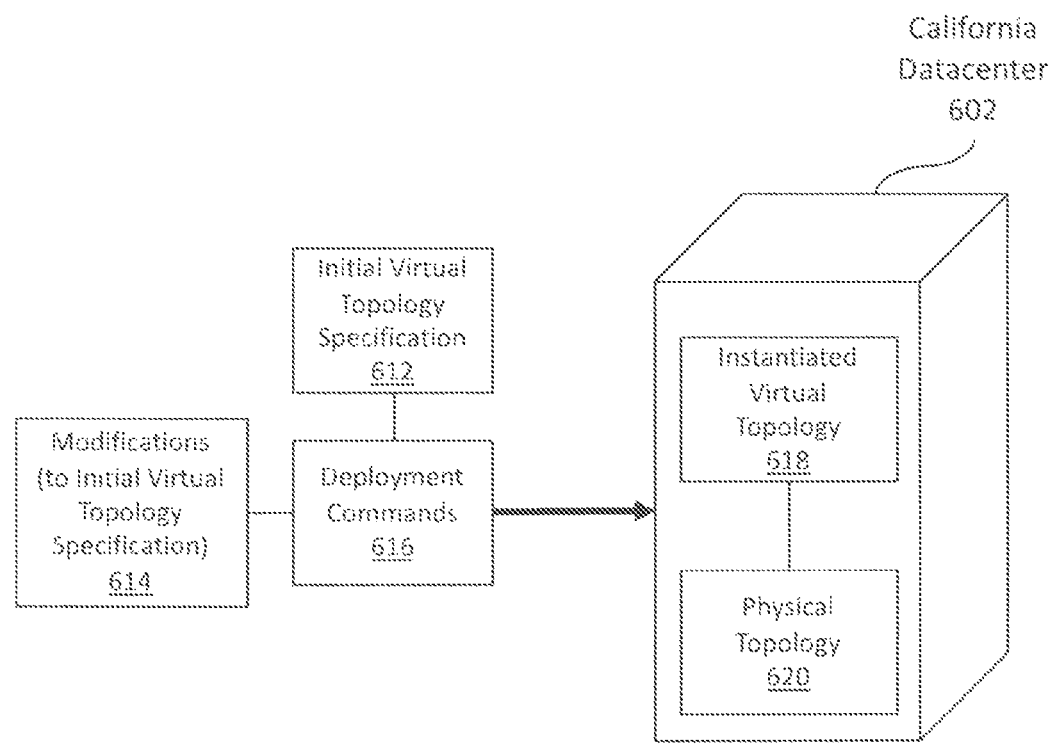
FIGS. 6A-6B illustrate examples of snapshotting and instantiating a virtual topology, in accordance with one or more embodiments.
Figure 6B:
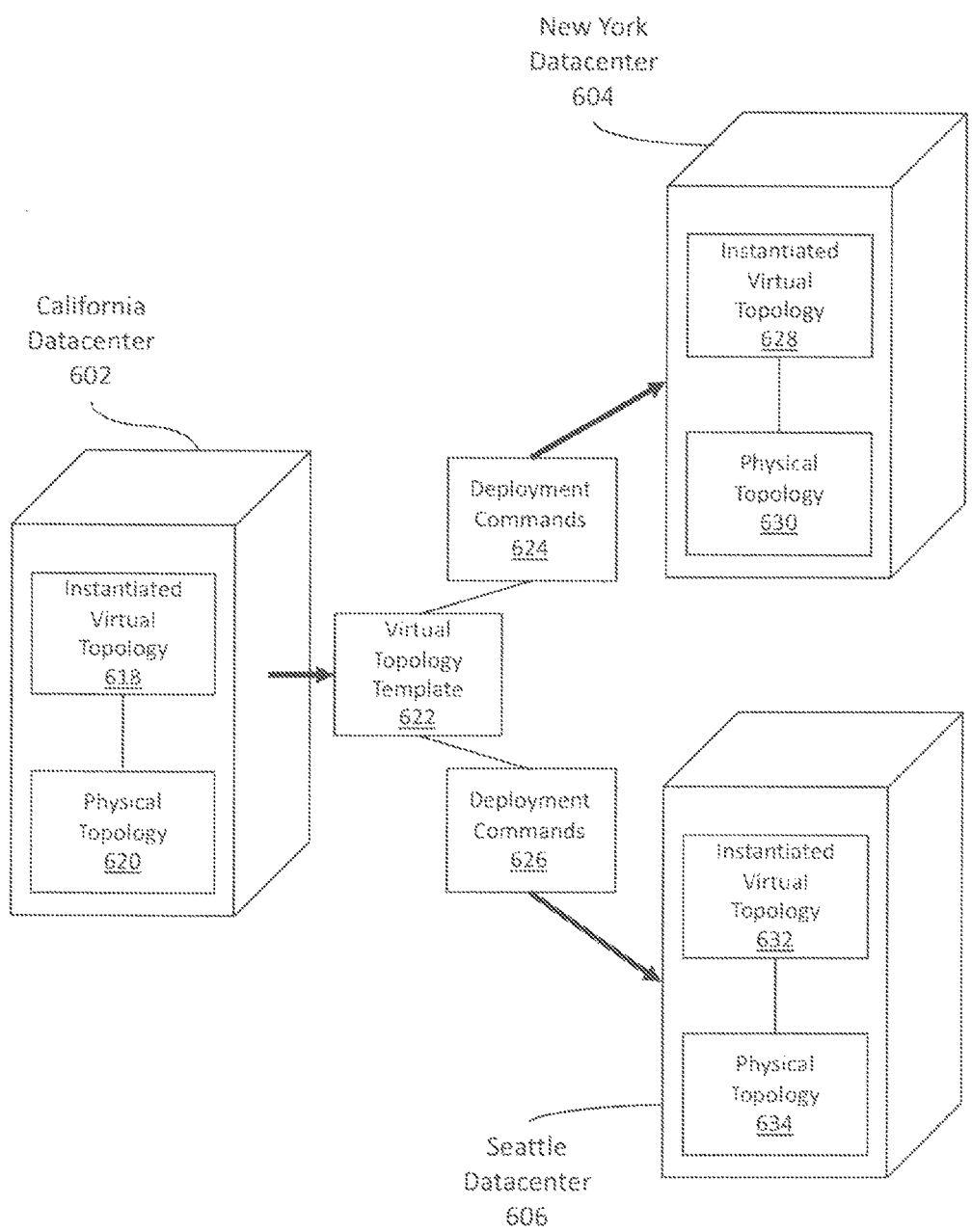

FIGS. 6A-6B illustrate examples of snapshotting and instantiating a virtual topology, in accordance with one or more embodiments.

As illustrated in FIG. 6A, a California datacenter 602 includes a set of digital devices corresponding to a physical topology 620.

A deployment engine receives user input including the initial virtual topology specification 612. For the purpose of this example, the initial virtual topology specification 612 is the same as the virtual topology specification 202 illustrated in FIG. 2A. Having satisfied certain compliance and/or network requirements, the initial virtual topology specification 612 is to be used to deploy a virtual topology 618.

The deployment engine receives user input identifying the physical topology 620 for instantiating a virtual topology 618. The deployment engine obtains information describing the physical topology 620, including information describing the digital devices thereon.

The deployment engine generates deployment commands 616. The deployment engine maps each VTE in the initial virtual topology specification 612 to one or more digital devices in the physical topology 620. The deployment commands 616 may be executed to instantiate each VTE onto the mapped digital devices. The deployment commands include VTE characteristics of each VTE.

The deployment engine identifies and instantiates each VTE based on deployment commands 616, as described below. Referring to the virtual topology specification 202 of FIG. 2A, the deployment engine identifies VTE characteristics of node 210. The deployment engine determines that node 210 is a subnet with a network prefix of 10.0.0.0/8. The deployment engine determines that node 210 has a relationship with firewall 212. The deployment engine instantiates node 210 onto one or more digital devices. Instantiating node 210 includes executing an encap-decap NIC associated with node 210. The deployment engine configures node 210 with the network prefix of 10.0.0.0/8. The deployment engine may postpone executing an interface between node 210 and firewall 212 until firewall 212 is instantiated.

The deployment engine identifies VTE characteristics of firewall 212. The deployment engine determines that firewall 212 is a firewall VTE with a particular filtering policy. The deployment engine determines that firewall 212 has a relationship with node 210 and a relationship with router 214. The deployment engine instantiates firewall 212 onto a digital device. Instantiating firewall 212 includes executing an encap-decap NIC associated with firewall 212. The deployment engine configures firewall 212 with the particular filtering policy. The deployment engine executes an interface between node 210 and firewall 212.

Similarly, the deployment engine identifies VTE characteristics of each VTE, based on deployment commands 616. The deployment engine instantiates each VTE in accordance with the VTE characteristics. Based on the execution of deployment commands 616, a virtual topology 618 is instantiated on the physical topology 620 in accordance with the initial virtual topology specification 612.

Subsequently, it is determined that the virtual topology 618 needs to be modified to satisfy a new compliance requirement. The deployment engine receives user input including modifications 614 to the initial virtual topology specification. Referring to the virtual topology specification 202 of FIG. 2A, a NAT is added between firewall 212 and router 214. The user input includes VTE characteristics of the NAT.

The deployment engine generates new deployment commands 616 based on the modifications 614. The deployment commands 616 map the NAT to one or more digital devices. The deployment commands 616 include VTE characteristics of the NAT.

The deployment engine identifies the VTE characteristics of the NAT based on the deployment commands. The deployment engine instantiates the NAT onto the mapped digital devices. The deployment engine executes an interface between the NAT and firewall 212. The deployment engine executes another interface between the NAT and router 214. The deployment engine may stop execution of the original interface between firewall 212 and router 214.

Based on the execution of the new deployment commands 616, a new virtual topology 618 is instantiated on the physical topology 620 in accordance with the initial virtual topology specification 612 and modifications 614.

As illustrated in FIG. 6B, a California datacenter 602 includes a set of digital devices corresponding to a physical topology 620. A virtual topology 618 is instantiated on the physical topology 620, as described above with respect to FIG. 6A. For the purposes of this example, the virtual topology 618 corresponds to a modified version of the virtual topology specification 202 illustrated in FIG. 2A. The modified version of the virtual topology specification 202 includes a NAT between firewall 212 and router 214.

Additionally, a New York datacenter 604 includes a set of digital devices corresponding to a physical topology 630. A Seattle datacenter 606 includes a set of digital devices corresponding to a physical topology 634. Physical topology 620, physical topology 630, and/or physical topology 634 may be the same as or different from each other.

A snapshot engine receives user input identifying a virtual topology 618 instantiated on physical topology 620 of the California datacenter 602. The user input includes identification of an initial VTE for initiating a snapshotting process. Referring to the virtual topology specification 202 of FIG. 2A, the initial VTE is node 210.

The snapshot engine sets node 210 as the "current VTE." The snapshot engine identifies VTE characteristics corresponding to node 210. The snapshot engine determines that node 210 implements a subnet functionality. The snapshot engine determines that node 210 is configured with a network prefix of 10.0.0.0/8. The snapshot engine determines that node 210 has a relationship with firewall 212. The snapshot engine generates code to specify the VTE characteristics of node 210. The snapshot engine stores the code in a virtual topology template 622.

The snapshot engine determines whether there are any VTEs related to node 210 that have not yet been traversed. The snapshot engine identifies firewall 212 as a non-traversed related VTE.

The snapshot engine sets firewall 212 as the "current VTE" and iterates the above process. Similarly, the snapshot engine traverses through each VTE in the virtual topology 618. The snapshot engine stores the VTE characteristics of each VTE in the virtual topology template 622. As a result, the virtual topology template 622 describes a virtual topology 618 that is known to satisfy certain compliance and/or network requirements.

A deployment engine, corresponding to New York datacenter 604, receives the virtual topology template 622. The deployment engine receives user input identifying the physical topology 630 for instantiating a virtual topology 628. The deployment engine obtains information describing the physical topology 630, including information describing the digital devices thereon.

The deployment engine generates deployment commands 624. The deployment engine maps each VTE in the virtual topology template 622 to one or more digital devices in the physical topology 630. The deployment engine identifies VTE characteristics of each VTE based on deployment commands 624. The deployment engine instantiates each VTE. Based on the execution of deployment commands 624, virtual topology 628 is instantiated on physical topology 630 in accordance with virtual topology template 622.

Additionally, a deployment engine, corresponding to Seattle datacenter 606, receives the virtual topology template 622. Similar to the operations described above, the deployment engine generates deployment commands 626. Based on the execution of deployment commands 626, virtual topology 632 is instantiated on physical topology 634 in accordance with virtual topology template 622.

As illustrated in the above example, virtual topology 618, implemented at the California datacenter 602, is used to generate a virtual topology template 622. Virtual topology 618 is duplicated at the New York datacenter 604 and the Seattle datacenter 606 using the virtual topology template 622. Since virtual topology 618 is known to satisfy certain compliance and/or network requirements, virtual topology 628 and virtual topology 632 may be instantiated without needing to redesign any computer networks for the New York datacenter 604 and the Seattle datacenter 606.

7. Computer Networks

In one or more embodiments, a computer network provides connectivity among a set of nodes. The set of nodes are connected by a set of links. The nodes may be local to and/or remote from each other. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a service provider provides a computer network to one or more end users. Various service models may be implemented by the computer network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Miscellaneous; Extensions

A method comprising:
identifying a plurality of virtual topology entities (VTEs) in a virtual topology;
traversing each particular VTE of the plurality of VTEs to determine VTE characteristics comprising one or more of:
   a functionality corresponding to the particular VTE;
   a configuration corresponding to the particular VTE;
   a relationship corresponding to the particular VTE; and
storing the VTE characteristics for each particular VTE of the plurality of VTEs as a virtual topology template,
wherein the method is performed by at least one device including a hardware processor.

A system comprising:
at least one device including a hardware processor; and
the system being configured to perform operations comprising:
identifying a plurality of virtual topology entities (VTEs) in a virtual topology;
traversing each particular VTE of the plurality of VTEs to determine VTE characteristics comprising one or more of:
   a functionality corresponding to the particular VTE;
   a configuration corresponding to the particular VTE;
   a relationship corresponding to the particular VTE; and
storing the VTE characteristics for each particular VTE of the plurality of VTEs as a virtual topology template.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
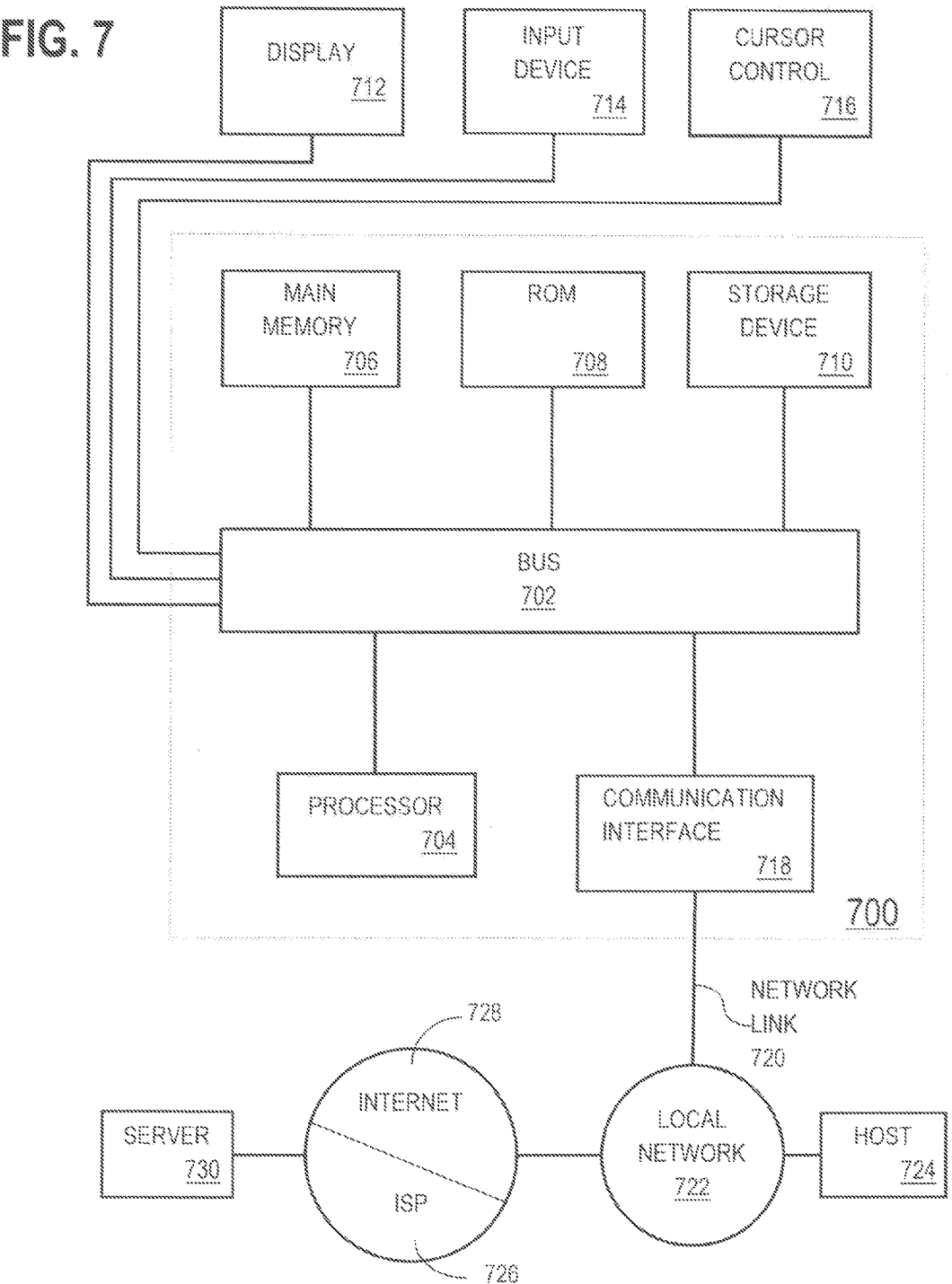
FIG. 7 shows a block diagram that illustrates a computer system, in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a plurality of virtual topology entities (VTEs) in a first virtual topology, wherein each VTE of the plurality of VTEs is associated with a functionality;
    traversing each VTE of the plurality of VTEs to determine respective relationships associated with each VTE;
    wherein a particular relationship associated with a first VTE, of the plurality of VTEs, identifies (a) a second VTE, of the plurality of VTEs, that is related to the first VTE and (b) a forwarding policy that governs a transmission of data between the first VTE and the second VTE;
    storing a description of the respective relationships associated with each VTE of the plurality of VTEs into a virtual topology template; and
    instantiating, on one or more hardware devices, a second virtual topology including the plurality of VTEs, and the respective relationships associated with the plurality of VTEs, based on the virtual topology template.

2. The medium of claim 1, wherein the plurality of VTEs are identified based on the first virtual topology instantiated on a first physical topology, and the virtual topology template is used to instantiate the second virtual topology on a second physical topology.

3. The medium of claim 1, wherein the operations further comprise:
    instantiating a plurality of virtual topologies onto different physical topologies based on the virtual topology template.

4. The medium of claim 1, wherein the virtual topology template comprises a description of the virtual topology expressed in graphic form.

5. The medium of claim 1, wherein the virtual topology template comprises a description of the virtual topology expressed in code form.

6. The medium of claim 1, wherein traversing each VTE of the plurality of VTEs to determine respective relationships for each VTE comprises:
setting an initial VTE, for initiating a snapshotting process, as a current VTE;
identifying a relationship for the current VTE;
identifying a related VTE that is related to the current VTE;
setting the related VTE as the current VTE; and
iterating the operation of identifying the relationship for the current VTE.

7. The medium of claim 1, wherein the functionality associated with a particular VTE, of the plurality of VTEs, comprises an ability to perform at least one of:
routing and/or forwarding data to a next hop;
filtering and/or rejecting data based on a criterion;
inspecting data for security issues and/or other issues;
hiding and/or modifying a source address and/or destination address of data;
distributing data to resources based on availability of resources;
compressing data; and
caching data.

8. The medium of claim 1, wherein the forwarding policy determines a next hop for a data packet based upon a destination prefix of the data packet.

9. The medium of claim 1, wherein each VTE of the plurality of VTEs is further associated with a configuration that comprises an attribute associated with implementing the functionality corresponding to the VTE.

10. The medium of claim 1, wherein the virtual topology satisfies a particular network requirement.

11. The medium of claim 1, wherein the forwarding policy specifies an intermediate VTE to be traversed between the first VTE and the second VTE.

12. The medium of claim 1, wherein the forwarding policy specifies a filtering criteria for data packets transmitted between the first VTE and the second VTE.

13. A non-transitory computer readable medium comprising instructions which, when executed by one or more hardware processors, causes performance of operations comprising:
obtaining a virtual topology template comprising a description of a plurality of virtual topology entities (VTEs);
wherein the virtual topology template specifies (a) a functionality associated with each VTE of the plurality of VTEs and (b) a relationship associated with each VTE of the plurality of VTEs;
wherein a particular relationship associated with a first VTE, of the plurality of VTEs, identifies (a) a second VTE, of the plurality of VTEs, that is related to the first VTE and (b) a forwarding policy that governs a transmission of data between the first VTE and the second VTE;
based on the virtual topology template, generating a set of commands for instantiating a virtual topology including the plurality of VTEs, the set of commands indicating:
a first set of VTE characteristics corresponding to a first VTE;
a second set of VTE characteristics corresponding to a second VTE;
the particular relationship between the first VTE and the second VTE;
instantiating, on a first set of one or more hardware devices, the first VTE in accordance with the first set of VTE characteristics;
instantiating, on a second set of one or more hardware devices, the second VTE in accordance with the second set of VTE characteristics; and
establishing the particular relationship between the first VTE and the second VTE by executing an interface between the first VTE and the second VTE that implements the forwarding policy.

14. The medium of claim 13, wherein executing the interface between the first VTE and the second VTE that implements the forwarding policy comprises: allowing encapsulation mappings to be shared across the first VTE and the second VTE.

15. The medium of Claim 13, wherein the virtual topology template is generated based on an instantiated virtual topology.

16. The medium of claim 13, wherein instantiating the first VTE comprises:
causing execution of an encapsulation-decapsulation network interface card associated with the first VTE, the encapsulation-decapsulation network interface card being configured to encapsulate data for transmission via an underlying network.

17. The medium of claim 13, wherein the particular relationship between the first VTE and the second VTE requires that data transmitted from the first VTE to the second VTE must traverse a third VTE.

18. The medium of claim 13, wherein instantiating the first VTE comprises:
causing execution of an application configured to implement a functionality specified by the first set of VTE characteristics.

19. A method comprising:
identifying a plurality of virtual topology entities (VTEs) in a first virtual topology, wherein each VTE of the plurality of VTEs is associated with a functionality;
traversing each VTE of the plurality of VTEs to determine respective relationships associated with each VTE;
wherein a particular relationship associated with a first VTE, of the plurality of VTEs, identifies (a) a second VTE, of the plurality of VTEs, that is related to the first VTE, and (b) a forwarding policy that governs a transmission of data between the first VTE and the second VTE;
storing a description of the respective relationships associated with each VTE of the plurality of VTEs into a virtual topology template; and
instantiating, on one or more hardware devices, a second virtual topology including the plurality of VTEs, and the respective relationships associated with the plurality of VTEs, based on the virtual topology template;
wherein the method is performed by at least one device including a hardware processor.

20. The method of claim 19, wherein the plurality of VTEs are identified based on the first virtual topology instantiated on a first physical topology, and the virtual topology template is used to instantiate the second virtual topology on a second physical topology.

* * * * *